US012700636B2

(12) United States Patent
    Min et al.

(10) Patent No.:  US 12,700,636 B2
(45) Date of Patent:       Aug. 4, 2026

(54) BATTERY

(71) Applicant: EVE POWER CO., LTD., Jingmen (CN)

(72) Inventors: Changfei Min, Jingmen (CN); Tianli Xiao, Jingmen (CN); Liming Huang, Jingmen (CN)

(73) Assignee: EVE POWER CO., LTD., Jingmen (CN)

( * ) Notice: Subject to any disclaimer, the term of this patent is extended or adjusted under 35 U.S.C. 154(b) by 735 days.

(21) Appl. No.: 18/078,110

(22) Filed: Dec. 9, 2022

(65) Prior Publication Data

US 2024/0088501 A1     Mar. 14, 2024

Related U.S. Application Data

(63) Continuation of application No. PCT/CN2022/128905, filed on Nov. 1, 2022.

(30) Foreign Application Priority Data

Sep. 9, 2022   (CN) .......................... 202211105002.8
Sep. 9, 2022   (CN) .......................... 202222421539.7

(51) Int. Cl.
    *H01M 50/236*        (2021.01)
    *H01M 50/202*        (2021.01)
                (Continued)

(52) U.S. Cl.
    CPC ....... *H01M 50/236* (2021.01); *H01M 50/202* (2021.01); *H01M 50/271* (2021.01); *H01M 50/30* (2021.01)

(58) Field of Classification Search
    None
    See application file for complete search history.

(56) References Cited

U.S. PATENT DOCUMENTS

| | | | | |
|---|---|---|---|---|
| 6,146,785 A | * | 11/2000 | Rigobert ............. | H01M 50/538 |
| | | | | 180/68.5 |
| 2009/0305122 A1 | * | 12/2009 | Mitani ................ | H01M 50/171 |
| | | | | 429/94 |
| 2016/0301118 A1 | * | 10/2016 | Chami ................ | H01M 10/654 |

FOREIGN PATENT DOCUMENTS

| | | |
|---|---|---|
| CN | 101399361 A | 4/2009 |
| CN | 101599555 A | 12/2009 |
|    | (Continued) | |

OTHER PUBLICATIONS

European Search Report issued in corresponding EP application No. 22817057, mailed Sep. 1, 2025 (7 pages).

(Continued)

*Primary Examiner* — Alix E Eggerding
(74) *Attorney, Agent, or Firm* — Sughrue Mion, PLLC

(57) ABSTRACT

Disclosed is a battery, including a shell assembly, a jellyroll, and a support bar. The shell assembly defines a receiving cavity. The jellyroll is received in the receiving cavity. The support bar is disposed at a middle portion of the jellyroll. Two ends of the support bar protrude to an outside of the jellyroll and abuts against two opposite inner walls of the shell assembly. Positions of the shell assembly abutted by the support bar are recessed to form positioning slots. The two ends of the support bar are inserted into the positioning slots. The shell assembly includes a shell and a cap set connected to the shell. The shell defines an opening, the cap set covers and seals the opening. At least one end of the support bar abuts against the cap set.

21 Claims, 5 Drawing Sheets

(51) Int. Cl.
    H01M 50/271     (2021.01)
    H01M 50/30     (2021.01)

(56)           References Cited

FOREIGN PATENT DOCUMENTS

| | | | |
|---|---|---|---|
| CN | 106505163 | A | 3/2017 |
| CN | 206250259 | U | 6/2017 |
| CN | 110767848 | A | 2/2020 |
| CN | 212062562 | U | 12/2020 |
| CN | 212485415 | U | 2/2021 |
| CN | 218299857 | U | 1/2023 |
| WO | 2022170487 | A1 | 8/2022 |

OTHER PUBLICATIONS

Communication dated Mar. 6, 2026, issued in Chinese Application No. 202211105002.8.

* cited by examiner

BATTERY

CROSS REFERENCE TO RELATED APPLICATIONS

The present application is a continuation-application of the International Patent Application No. PCT/CN2022/128905, filed on Nov. 1, 2022, which claims priority of Chinese Patent Application No. 202211105002.8, filed on Sep. 9, 2022, and priority of Chinese Patent Application No. 202222421539.7, filed on Sep. 9, 2022, in China National Intellectual Property Administration, the entire contents of which are hereby incorporated by reference in their entireties.

TECHNICAL FIELD

The present disclosure relates to the field of energy storage, and in particular to a battery.

BACKGROUND

After a battery is assembled, a shell and a cap assembly may be directly subjected to an external force. Therefore, strengths of the shell and the cap assembly is particularly important. In the case that the shell and the cap assembly is not strong enough to bear pressures, the battery may be easily deformed, and may not be used normally. In the art, in order to increase the pressure-bearing capacity of the shell and the cap assembly, thicknesses of the shell and cap assembly may be increased. This has the following disadvantages. When the thicknesses of the shell and the cap assembly are increased, within a same space, an energy density of the battery may be affected. Further, the increased thicknesses may increase manufacturing costs.

SUMMARY OF THE DISCLOSURE

The present disclosure provides a battery, which is highly resistant to compression, less likely to be deformed, has a high energy density, and has a lower cost.

The present disclosure provides a battery including: a shell assembly, defining a receiving cavity; a jellyroll, received in the receiving cavity; and a support bar, disposed at a middle portion of the jellyroll. Each of two ends of the support bar protrudes to an outside of the jellyroll, the shell assembly has two inner walls opposite to each other, one of the two ends of the support bar abuts against one of the two inner walls, and the other one of the two ends of the support bar abuts against the other one of the two inner walls. A position of the shell assembly abutted by the support bar is recessed to form a positioning slot, each of the two ends of the support bar is inserted into the positioning slot. The shell assembly includes a shell and a cap set connected to the shell, the shell defines an opening, the cap set covers and seals the opening, and at least one of the two ends of the support bar abuts against the cap set.

Figure 1:
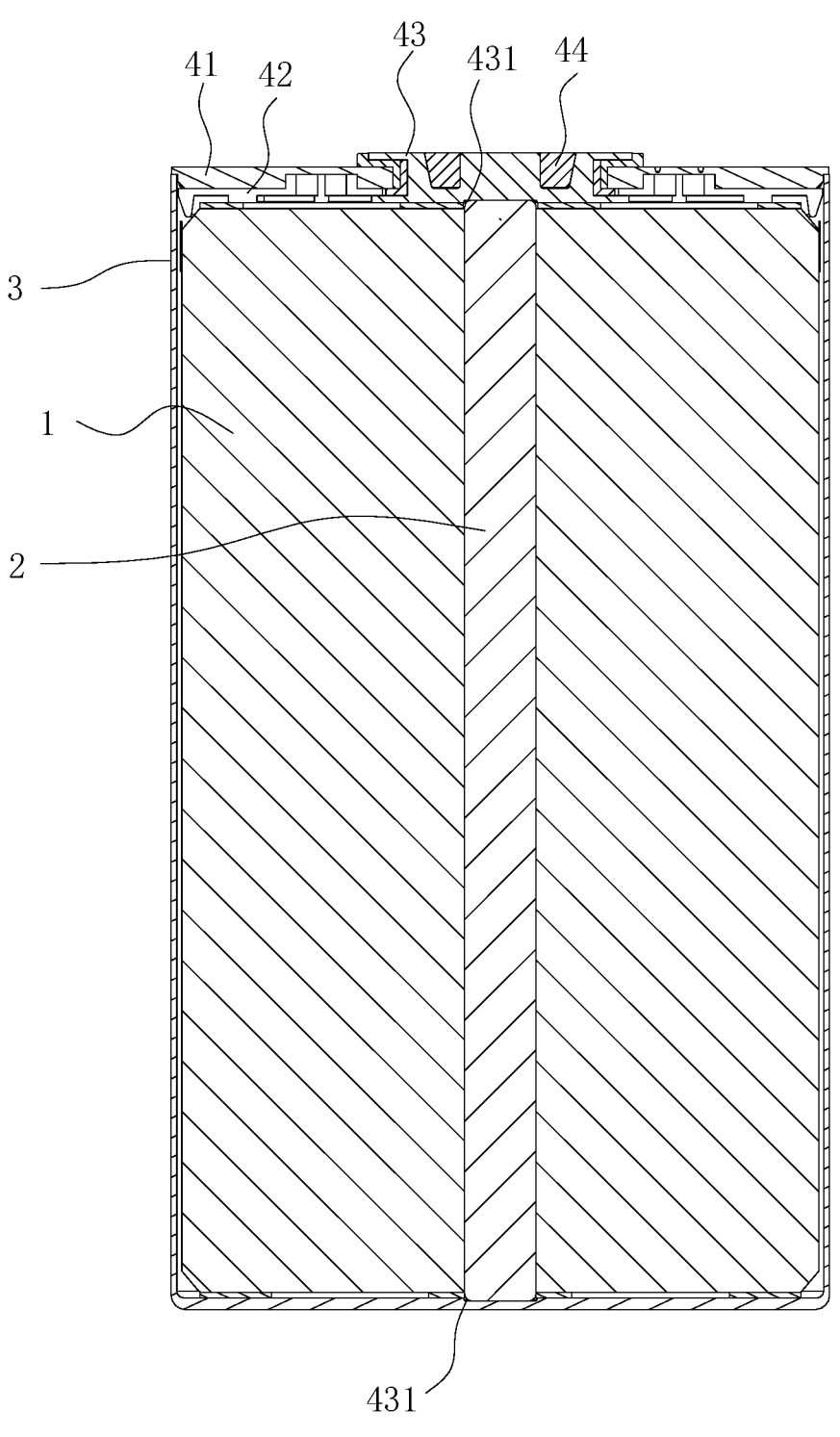
FIG. 1 is a cross-sectional view of a battery according to an embodiment of the present disclosure.

1, jellyroll; 2, support bar; 3, shell; 4, cap set; 41, body portion; 411, first through hole; 412, insertion groove; 413, explosion-proof mark; 42, plastic member; 421, second through hole; 422, reinforcement protrusion; 423, first side; 424, second side; 425, reinforcing groove; 426, reinforcing rib; 4261, first rib; 4262, second rib; 427, air-vent hole; 43, pole; 431, positioning slot; 432, first end face; 433, second end face; 434, welding groove; 435, connection portion; 436, limiting portion; 437, engaging groove; 44, blocking member; 5, current collector; 6, first seal; 61, first sleeve; 62, first sealing plate; 7, second seal; 71, second sleeve; 72, second sealing plate.

DETAILED DESCRIPTION

In the description of the present disclosure, to be noted that, terms "center", "top", "bottom", "left", "right", "vertical", "horizontal", "inside", "outside", and so on, may indicate an orientation or a positional relationship based on an orientation or a positional relationship shown in the accompanying drawings. These terms are used only to facilitate and simplify description of the present disclosure, but do not indicate or imply that a device or an element must have a particular orientation or must be operated and configured in a particular orientation. Furthermore, terms "first" and "second" are used for descriptive purposes only and shall not be interpreted as indicating or implying relative importance. In particular, terms "first position" and "second position" are two different positions. A first feature being "above", "above", and "on top of" a second feature includes the first feature being directly above and diagonally above the second feature, or indicates that a horizontal height of the first feature is higher than a horizontal height of the second feature. A first feature being "below", "under", and "beneath" a second feature includes the first feature being directly below and diagonally below the second feature, or indicates that a horizontal height of the first feature is lower than a horizontal height of the second feature.

In the present disclosure, to be noted that, unless explicitly stated otherwise, terms "mounted", "connected", "coupled" shall be interpreted broadly, such as fixed connection, detachable connection, or integrally connected; mechanical connection, electrical connection; direct connection, indirect connection via an intermediate medium, or communication between inner spaces of two elements. Any ordinary skilled person in the art shall understand a specific meaning of the above terms in the context of the present disclosure based on specific cases.

Embodiments of the present disclosure will be described in detail below. Examples of the embodiments are shown in the accompanying drawings. A same reference numeral or similar reference numerals of the entire description may indicate a same or similar elements or elements having a same or similar functions. The embodiments described below by referring to the accompanying drawings are exemplary and are used only for the purpose of explaining the present disclosure.

As shown in FIG. 1, FIG. 2, FIG. 3, and FIG. 7, the present embodiment provides a battery. The battery includes a shell assembly, a jellyroll 1, and a support bar 2. The shell assembly defines a receiving cavity. The jellyroll 1 is received in the receiving cavity. The support bar 2 is arranged at a middle of the jellyroll 1. The shell assembly has two opposite inner walls, and each of two ends of the support bar 2 protrudes to an outside of the jellyroll 1 and abuts against one of the two opposite inner walls. A position of the shell assembly being abutted by the support bar 2 is recessed to form a positioning slot 431. Each of the two ends of the support bar 2 is inserted into the positioning slot 431. The shell assembly includes a shell 3 and a cap set 4 connected to the shell 3. The shell 3 defines an opening, and the cap set 4 covers and seals the opening. At least one end of the support bar 2 tightly abuts against the cap set 4.

In the present embodiment, the battery is arranged with the support bar 2, which may support the shell assembly, preventing the shell assembly from being deformed. In addition, an excess space at the middle of the coiled cell 1 is utilized to install the support bar 2, the overall energy density of the battery may not be affected. An end of the support bar 2 abuts against the cap set 4 to support and strengthen the cap set 4, effectively preventing the cap set 4 from being deformed. The positioning slot 431 is defined to limit the position of each of the two ends of the support bar 2 to prevent the support bar 2 from shaking inside the battery.

In the present embodiment, the support bar 2 is an insulated bar, such that conductivity of a location where the support bar 2 contacts does not need to be considered, such that an internal structure of the battery is simplified.

In an embodiment, the support bar 2 may be a solid bar. The solid support bar 2 has a high strength and may not be easily deformed. In other embodiments, the support bar 2 may be a hollow bar. The hollow support bar 2 may be light, and a weight of the entire battery may be reduced.

In an example, the cap set 4 includes a body portion 41, a plastic member 42, and a pole 43. The body portion 41 defines a first through hole 411. The plastic member 42 is arranged on a side of the body portion 41 near an inside of the shell 3. The plastic part 42 defines a second through hole 421 at a position corresponding to the first through hole 411. A first end of the pole 43 is received in the receiving cavity and is connected to a tab of the jellyroll 1. A second end of the pole 43 successively extends through the second through hole 421 and the first through hole 411 to be disposed out of the receiving cavity. A reinforcing protrusion 422, which forms one loop, is arranged on and protrudes from a side of the plastic member 42 facing the body portion 41. The reinforcing protrusion 422 surrounds the pole 43. The body portion 41 is recessed to form an insertion groove 412 for the reinforcing protrusion 422 to be inserted. The ring-shaped reinforcing protrusion 422, which is arranged on the plastic member 42 of the cap set 4, may improve the strength of the cap set 4, effectively preventing the cap set 4 from being deformed. By defining the insertion groove 412 on the side of the body portion 41 near the plastic member 42, the insertion groove 412 may receive the protruded reinforcing protrusion 422, ensuring the body portion 41 and the plastic member 42 to be tightly attached to each other. In addition, an outer side of the body portion 41 (i.e., a side away from the plastic member 42) may be flat, allowing the battery to be assembled easily at a later stage.

Figure 2:
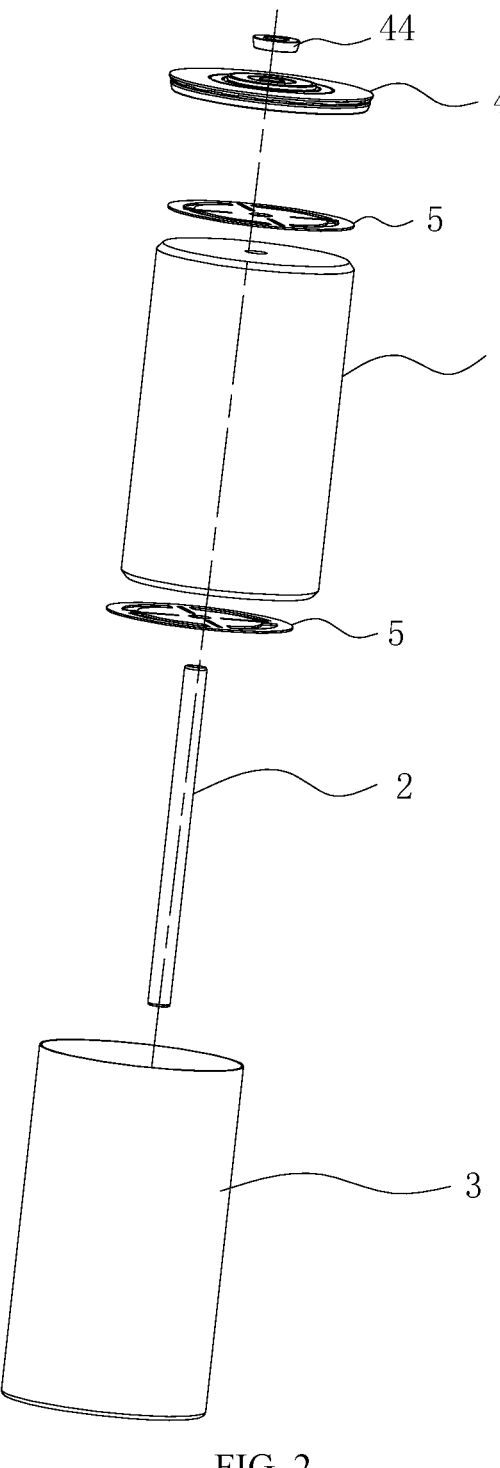
FIG. 2 is an exploded view of the battery according to an embodiment of the present disclosure.

In the present embodiment, as shown in FIG. 1 and FIG. 2, along a length direction of the shell 3, a first end of the shell 3 defines the opening, and a second end of the shell 3 is sealed. Therefore, along a length direction of the support bar 2, a first end of the support bar 2 abuts against an inner side wall of the cap set 4, and a second end of the support bar 2 abuts against an inner side wall of the sealed end of the shell 3. In this way, the sealed end of the shell 3 may be flat. Exemplarily, the support bar 2 is disposed at a center of the shell 3. That is, the first end of the support bar 2 tightly abuts against the center of the inner side wall of the cap set 4, and the second end of the support bar 2 tightly abuts against the center of the inner side wall of the sealed end of the shell 3.

To be noted that, the shell 3 is arranged to have the opening end and the sealed end.

Alternatively, the shell 3 may be arranged to have two opening ends in the length direction, and each of the two opening ends is covered by one cap set 4. In this case, each of the two ends of the support bar 2 tightly abuts against the inner side wall of one cap set 4.

Figure 3:
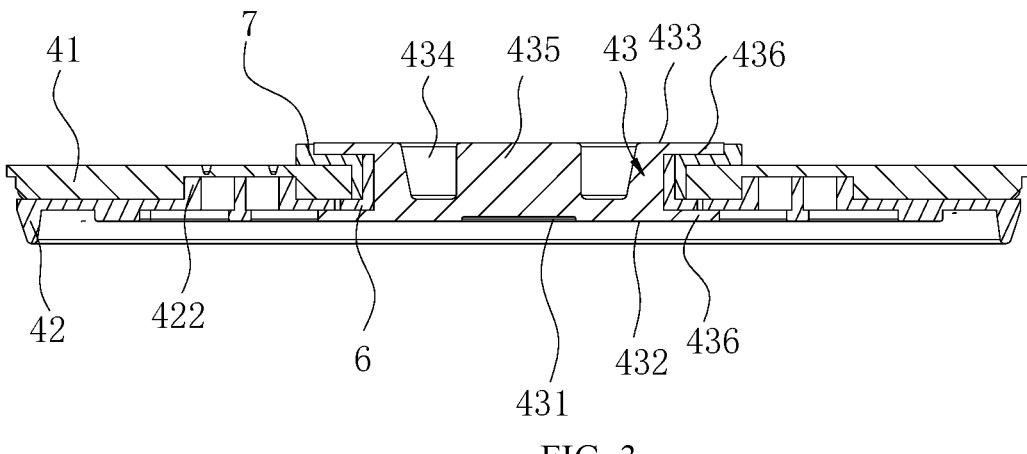
FIG. 3 a cross-sectional view of a cap set according to an embodiment of the present disclosure.
Figure 7:
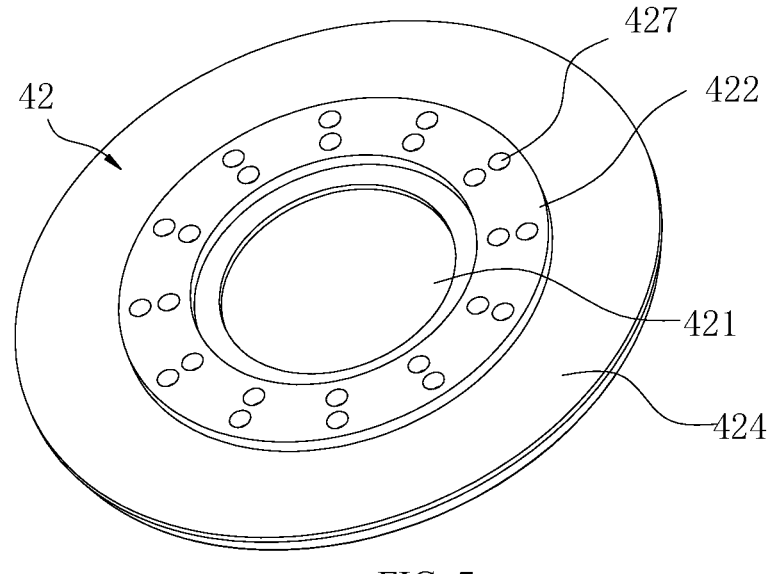
FIG. 7 is a perspective view of a plastic member, which is viewed from a first viewing angle, according to an embodiment of the present disclosure.
Figure 8:
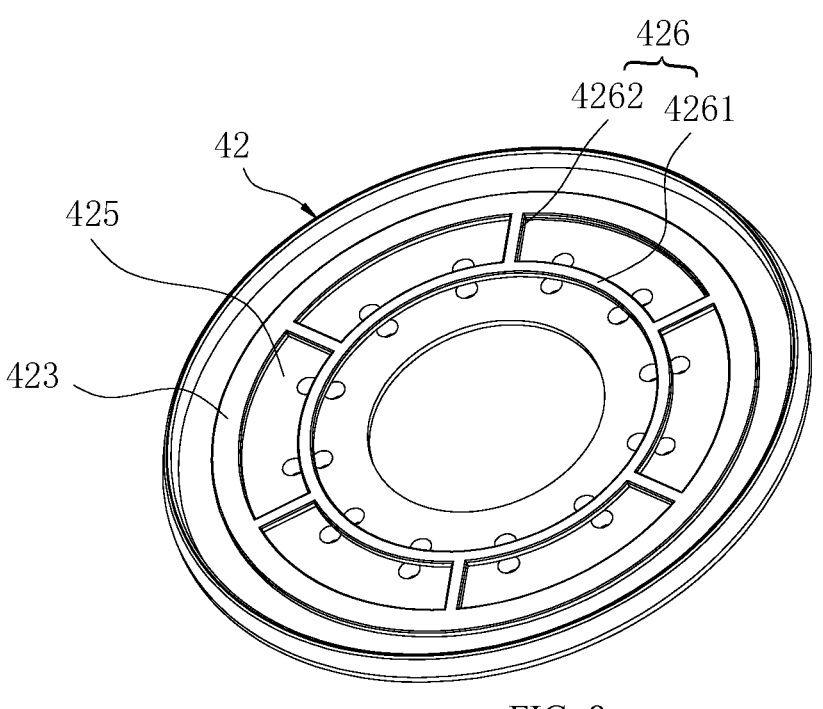
FIG. 8 is a perspective view of a plastic member, which is viewed from a second viewing angle, according to an embodiment of the present disclosure.

In an embodiment, as shown in FIG. 3, FIG. 7, and FIG. 8, the plastic member 42 has a first side 423 and a second side 424 opposite to the first side 423. The first side 423 faces the jellyroll 1, and the reinforcing protrusion 422 is arranged on and protrudes from the second side 424. A position of the first side 423 corresponding to the reinforcing protrusion 422 is recessed to form a reinforcing groove 425. A reinforcing rib 426 is received in the reinforcing groove 425 and protrudes from a wall of the reinforcing groove 425. By defining the reinforcing groove 425, the outwardly-protruded reinforcing protrusion 422 may be arranged without increasing a weight of the plastic member 42. By arranging the reinforcing rib 426 inside the reinforcing groove 425, the strength of the reinforcing protrusion 422 may be increased, i.e., the overall strength of the plastic member 42 may be increased.

In the present embodiment, the second through hole 421 extends through a center of a bottom wall of the reinforcing groove 425.

The reinforcing rib 426 includes a ring-shaped first rib 4261. The first rib 4261 surrounds the second through hole 421. An outer wall of the first rib 4261 is connected to the wall of the reinforcing groove 425 by a second rib 4262. A plurality of second ribs 4262 are arranged around a circumferential portion of the first rib 4261. By arranging the first rib 4261 that surrounds the second through hole 421, an opening region may be enveloped and reinforced. The second ribs 4262 are arranged to connect the first rib 4261 to the wall of the reinforcing groove 425, such that a force applied to the first rib 4261 may be transferred to a thicker region of the plastic member 42 (a region without the reinforcing groove 425), and the strength of the entire plastic member 42 may be improved.

In an embodiment, a height of the reinforcing rib 426 is not greater than a depth of the reinforcing groove 425. Exemplarily, the height of the reinforcing rib 426 is the same as the depth of the reinforcing groove 425, such that a surface of the reinforcing rib 426 away from the bottom wall of the reinforcing groove 425 may flush with or align with the side of the plastic member 42 near the jellyroll 1.

For example, six second ribs 4262 are equally spaced apart from each other and are arranged around the circumferential portion of the first rib 4261. An inner wall of the first rib 4261 is spaced apart from a wall of the second through hole 421. The evenly distributed second ribs 4262 may evenly spread the force applied to the first rib 4261. Of course, the number of second ribs 4262 may be variable, and the certain number of second ribs 4262 may be symmetrically arranged or unequally spaced apart from each other.

In an embodiment, as shown in FIGS. 3 to 6, the body portion 41 is arranged with an explosion-proof mark 413. A position of the plastic member 42 corresponding to the explosion-proof mark 413 defines an air-vent hole 427. By arranging the explosion-proof mark 413, when a pressure inside the battery is excessively high, the pressure may be released safely. By defining the air-vent hole 427, the plastic member 42 may not block the explosion-proof mark 413 of the body portion 41, ensuring a gas in the battery may be released through the explosion-proof mark 413 when the pressure needs to be released. A shape of the air-vent hole 427 may be round, squared, triangular or irregularly shaped.

In the present embodiment, the explosion-proof mark 413 is arranged to surround the first through hole 411. A plurality of air-vent holes 427 are defined corresponding to the explosion-proof mark 413. The plurality of air-vent holes 427 are spaced apart from each other and are located along a circumference direction of the explosion-proof mark 413. The ring-shaped explosion-proof mark 413 allows a pressure releasing area to be increased, increasing a pressure releasing speed.

In an embodiment, the body portion 41 is arranged with two explosion-proof marks 413. The two explosion-proof marks 413 are concentric and both surround the first through hole 411. Each of the two explosion-proof marks 413 has two ends in a circumferential direction, and for each of the two explosion-proof marks 413, the two ends are spaced apart from each other. That is, the explosion-proof mark 413 is not in an enclosed circle. The explosion-proof marks 413 may improve the pressure releasing effect. By configuring the explosion-proof mark 413 to be the non-enclosed circle, components of the body portion 41 may not be fallen off after the pressure is released. Exemplarily, a diameter of an inner explosion-proof mark 413 may be in range of 18 mm to 36 mm, and a distance between an outer explosion-proof mark 413 and the inner explosion-proof mark 413 may be in range of 2 mm to 8 mm.

Of course, one or more loops of explosion-proof marks 413 may be arranged, and the number of loops of the explosion-proof marks 413 may be determined based on demands. In addition, the explosion-proof mark 413 may be configured as an enclosed circle.

In an embodiment, as shown in FIGS. 1 to 3, the pole 43 has a first end face 432 and a second end face 433 opposite to the first end face 432. The first end face 432 is received in the receiving cavity and is welded to the current collector 5. The support bar 2 abuts against the first end face 432. One of two positioning slots 431 is recessed in the first end face 432. The inner wall of the sealed end of the shell 1 is recessed to form the other one of the two positioning slots 431. Exemplarily, internal threads are arranged on a wall of each of the two positioning slots 431, and an outer periphery of each of the two ends of the support bar 2 is arranged with external threads. Each of the two ends of the support bar 2 is threadly connected to one of the two positioning slots 431. The threaded connection may completely prevent the support bar 2 from shaking and simplify assembling of the support bar 2. In other embodiments, the two ends of the support bar 2 may alternatively be fixed in the two positioning slots 431 by gluing, clamping or interference fit.

Figure 4:
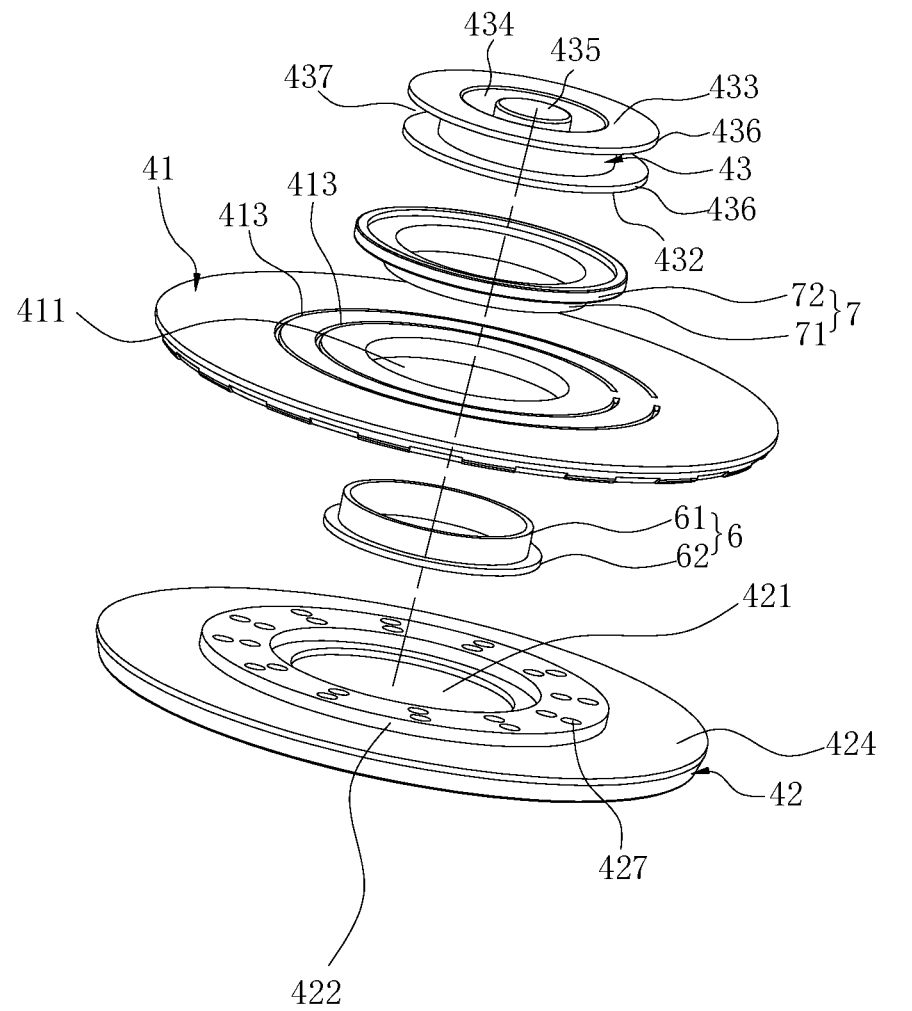
FIG. 4 is an exploded view of the cap set according to an embodiment of the present disclosure.
Figure 5:
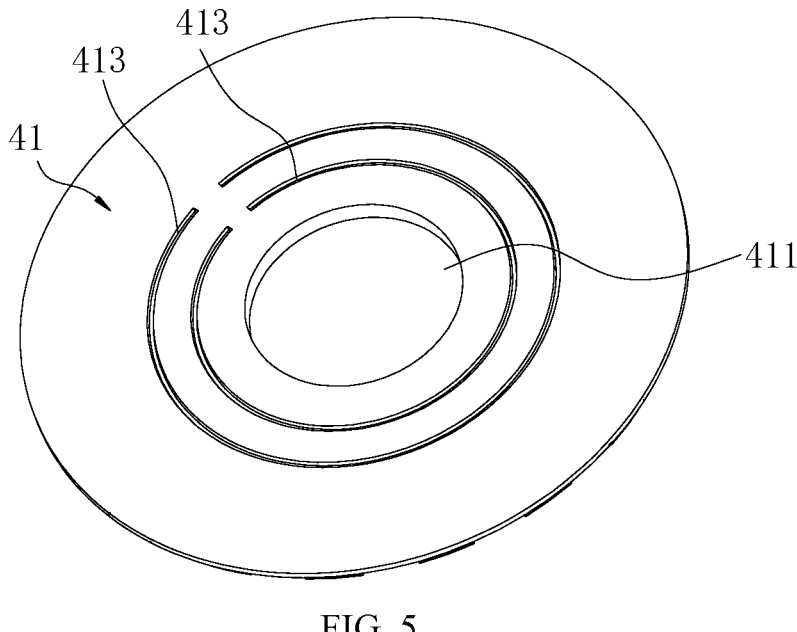
FIG. 5 is a perspective view of a body portion, which is viewed from a first viewing angle, according to an embodiment of the present disclosure.
Figure 6:
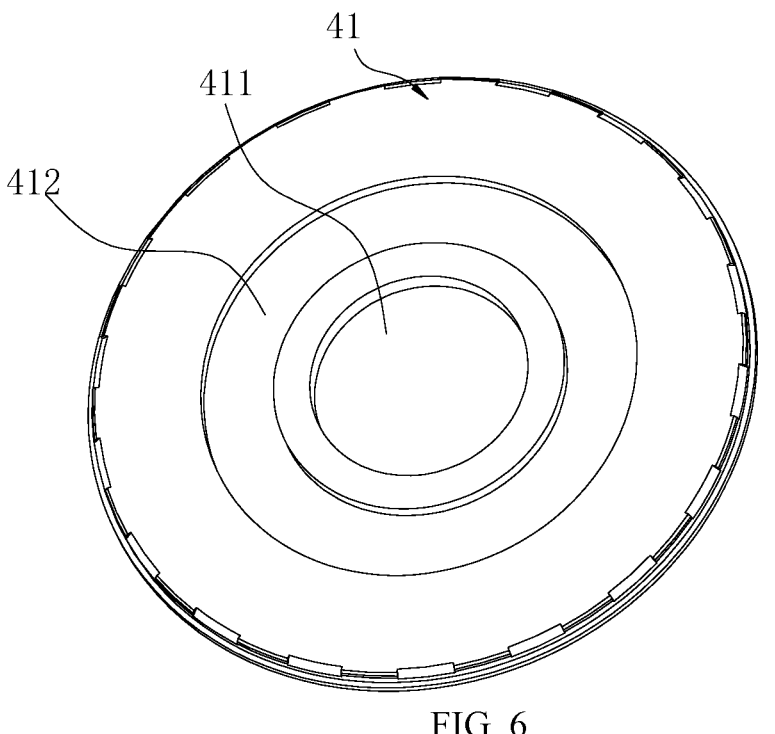
FIG. 6 is a perspective view of a body portion, which is viewed from a second viewing angle, according to an embodiment of the present disclosure.

In an embodiment, as shown in FIG. 3 and FIG. 4, the second end face 433 of the pole 43 is recessed to form a welding groove 434, and the first end face 432 is configured to be welded with the current collector 5. The current collector 5 is connected to one tab of the jellyroll 1. By defining the welding groove 434, laser welding may be performed on an outer side of the pole 43, such that the current collector 5 may be fixed to the first end face 432 of the pole 43, the second end face 433 of the pole 43 may be flat after the welding.

In the present embodiment, the pole 43 further includes a connection portion 435 configured to connect to an external but sheet. The welding groove 434 may be a ring-shaped groove surrounding a circumference of the connection portion 435. By arranging the connection portion 435, the external but sheet may be welded easily.

Exemplarily, a cross section of the connection portion 435 may be circular. A diameter of the cross section of the connection portion 435 may be in a range of 3 mm to 10 mm. This size allows the connection portion 435 to have an enough welding area to be welded with the external but sheet, increasing strength of connection between the bus sheet and the pole 43 after the welding.

In an embodiment, as shown in FIG. 1 and FIG. 2, a blocking member 44 is received in the welding groove 434. By arranging the blocking member 44, the welding groove 434 may be full-filled, ensuring the second end surface 433 of the pole 43 to be flat. Further, the welding area for the bus sheet may be increased, and the strength of the connection between the bus sheet and the pole 43 after the welding may be increased. Exemplarily, the blocking member 44 is welded to the inside of the welding groove 434, and the welding may be fixed and stable.

In addition, each of the first end face 432 and the second end face 433 of the pole 43 extends away from the center of the pole 43 to form a limiting portion 436. The limiting portion 436 is ring shaped. An engaged groove 437 is defined between the limiting portions 436 of the first end face 432 and the limiting portions 436 of the second end face 433. After the pole 43 is arranged in the first through hole 411 and the second through hole 421, the limiting portion 436 of the first end face 432 abuts against an inner side of the cap set 4, and the limiting portion 436 of the second end face 433 abuts against an outer side of the cap set 4, such that the pole 43 is fixed.

In the present embodiment, the first end of the shell 3 defines the opening, and the second end of the shell 3 is sealed. The pole 43 of the cap set 4 is connected to one tab of the jellyroll 1, and the sealed end of the shell 3 is connected to another tab of the jellyroll 1. In order to avoid electrical conduction between the pole 43 and the body portion 41 of the cap set 4 (i.e., preventing the pole 43 from being electrically conducted with and having a short circuit with the shell 3), an insulating seal is arranged to seal positions where the pole 43 is connected to the two through holes and to insulate and isolate the pole 43 from the body portion 41.

Exemplarily, as shown in FIG. 3 and FIG. 4, the insulating seal includes a first seal 6 and a second seal 7. The first seal 6 includes a first sleeve 61 sleeving an outer side wall of the pole 43. An end of the first sleeve 61 is arranged with a first sealing plate 62. The first sealing plate 62 is clamped between the limiting portion 436 on the first end face 432 and the inner side wall of the plastic member 42. The second seal 7 includes a second sleeve 71 sleeving the first sleeve 61. An end of the second sleeve 71 is arranged with a second sealing plate 72. The second sealing plate 72 is clamped between the limiting portion 436 on the second end face 433 and the body portion 41.

In an embodiment, the shell 3 is cylindrical, and the cap set 4 is cylindrical. The pole 43 is disposed at the center of the cap set 4. The overall height of the battery is in a range from 65 mm to 130 mm, a diameter of the battery is in a range from 31 mm to 63 mm, a height that the pole 43 protrudes from the outer side of the body portion 41 is in a range from 0.6 mm to 3.2 mm, and a diameter of the support bar 2 is in a range from 3 mm to 8 mm.

The support bar 2 is made of plastics such as polyformaldehyde (POM) resin or high density polyethylene (HDPE).

The POM resin is one of synthetic resins, and is also known as polyformaldehyde resin, POM plastic, race steel material, and so on. The POM resin is white or black plastic granules having high hardness, high rigidity, and is highly resistant to wearing.

HDPE, also known as low-pressure polyethylene, is nontoxic, tasteless, odourless white granules having a melting point of 130° C. and a relative density of 0.946-0.976 g/cm3. The HDPE has good heat and cold resistance, good chemical stability, high rigidity and toughness, good mechanical strength, dielectric properties, and is highly resistance to environmental stress cracking.

What is claimed is:

1. A battery, comprising:
a shell assembly defining a receiving cavity, the shell assembly including a shell and a cap set, the cap set comprising a body portion, a plastic member, and a pole, wherein the shell defines an opening, the cap set covers and seals the opening;
a jellyroll being received in the receiving cavity;
a support bar being disposed at a middle portion of the jellyroll, wherein each of two ends of the support bar protrudes to an outside of the jellyroll, the shell assembly has two inner walls opposite to each other, one of the two ends of the support bar abuts against one of the two inner walls, and the other one of the two ends of the support bar abuts against the other one of the two inner walls;
a position of the shell assembly abutted by the support bar being recessed to form a positioning slot, each of the two ends of the support bar is inserted into the positioning slot;
the plastic member of the cap set including a first side and a second side opposite to the first side, the first side faces the jellyroll, a reinforcing protrusion being arranged on and protrudes from the second side, the reinforcing protrusion surrounding the pole, the body portion being recessed to form an insertion groove for the reinforcing protrusion to be inserted; and
a position of the first side corresponding to the reinforcing protrusion being recessed to form a reinforcing groove, a reinforcing rib being received in the reinforcing groove and protrudes from a wall of the reinforcing groove.

2. The battery according to claim 1, wherein the support bar is an insulating bar.

3. The battery according to claim 1,
wherein the body portion defines a first through hole, the plastic member is arranged on a side of the body portion near an inside of the shell, the plastic member defines a second through hole at a position corresponding to the first through hole; and
a first end of the pole is received in the receiving cavity and is connected to one tab of the jellyroll, a second end of the pole successively extends through the second through hole and the first through hole to be disposed out of the receiving cavity.

4. The battery according to claim 3, wherein the reinforcing rib comprises a ring-shaped first rib, the first rib surrounds the second through hole, an outer wall of the first rib is connected to the wall of the reinforcing groove by at least one second rib, and when the at least one second ribs are more than one second ribs, the more than one second ribs are arranged around a circumferential portion of the first rib.

5. The battery according to claim 3, wherein a height of the reinforcing rib is less than or equal to a depth of the reinforcing groove.

6. The battery according to claim 3, wherein the body portion is arranged with an explosion-proof mark, and a position of the plastic member corresponding to the explosion-proof mark defines at least one air-vent hole.

7. The battery according to claim 6, wherein the explosion-proof mark is arranged to surround the first through hole, when the at least one air-vent hole are a plurality of air-vent holes, the plurality of air-vent holes are defined corresponding to the explosion-proof mark, are spaced apart from each other, and are located along a circumference direction of the explosion-proof mark.

8. The battery according to claim 3, wherein the pole has a first end face and a second end face opposite to the first end face, the first end face is received in the receiving cavity and is welded to a current collector, the support bar abuts against the first end face, the current collector is connected to one tab of the jellyroll, and the second end face is recessed to form a welding groove.

9. The battery according to claim 8, wherein the pole further comprises a connection portion configured to connect to an external but sheet, and the welding groove is a ring-shaped groove surrounding a circumference of the connection portion.

10. The battery according to claim 9, wherein a cross section of the connection portion is circular, a diameter of the cross section of the connection portion is in a range of 3 mm to 10 mm.

11. The battery according to claim 8, wherein a blocking member is received in the welding groove.

12. The battery according to claim 8, wherein each of the first end face and the second end face of the pole extends away from a center of the pole to form a limiting portion, an engaged groove is defined between the limiting portions of the first end face and the limiting portions of the second end face; and
after the pole is arranged in the first through hole and the second through hole, the limiting portion of the first end face abuts against an inner side of the cap set, and the limiting portion of the second end face abuts against an outer side of the cap set.

13. The battery according to claim 12, further comprising an insulating seal, disposed at a position where the pole is connected to the first through hole and the second through hole.

14. The battery according to claim 13, wherein the insulating seal comprises a first seal and a second seal, the first seal comprises a first sleeve sleeving an outer side wall of the pole, and the second seal comprises a second sleeve sleeving the first sleeve.

15. The battery according to claim 14, wherein an end of the first sleeve is arranged with a first sealing plate, the first sealing plate is clamped between the limiting portion on the first end face and the inner side wall of the plastic member; and an end of the second sleeve is arranged with a second sealing plate, the second sealing plate is clamped between the limiting portion on the second end face and the body portion.

16. The battery according to claim 1, wherein internal threads are arranged on a wall of the positioning slot, an outer periphery of each of the two ends of the support bar is arranged with external threads, and each of the two ends of the support bar is threadly connected to the positioning slot.

17. The battery according to claim 1, wherein a first end of the shell defines the opening, a second end of the shell is sealed, and the positioning slot is defined on each of an inner side of the sealed end of the shell and an inner side of the cap set.

18. The battery according to claim 1, wherein the support bar is a solid bar.

19. The battery according to claim 1, wherein the support bar is a hollow bar.

20. A battery, comprising:

a shell assembly defining a receiving cavity, the shell assembly including a shell and a cap set, the cap set comprising a body portion and a plastic member, wherein the shell defines an opening and the cap set covers and seals the opening;

the body portion being arranged with an explosion-proof mark, and a position of the plastic member corresponding to the explosion-proof mark defines at least one air-vent hole;

a jellyroll being received in the receiving cavity;

a support bar being disposed at a middle portion of the jellyroll, wherein each of two ends of the support bar protrudes to an outside of the jellyroll, the shell assembly has two inner walls opposite to each other, one of the two ends of the support bar abuts against one of the two inner walls, and the other one of the two ends of the support bar abuts against the other one of the two inner walls; and a position of the shell assembly abutted by the support bar being recessed to form a positioning slot, each of the two ends of the support bar is inserted into the positioning slot.

21. A battery, comprising:

a shell assembly defining a receiving cavity, the shell assembly including a shell and a cap set, the cap set comprising a body portion, a plastic member, and a pole, wherein the shell defines an opening and the cap set covers and seals the opening;

a jellyroll being received in the receiving cavity;

a support bar being disposed at a middle portion of the jellyroll, wherein each of two ends of the support bar protrudes to an outside of the jellyroll, the shell assembly has two inner walls opposite to each other, one of the two ends of the support bar abuts against one of the two inner walls, and the other one of the two ends of the support bar abuts against the other one of the two inner walls;

a position of the shell assembly abutted by the support bar being recessed to form a positioning slot, each of the two ends of the support bar is inserted into the positioning slot; and wherein the pole has a first end face and a second end face opposite to the first end face, the first end face is received in the receiving cavity and is welded to a current collector, the support bar abuts against the first end face, the current collector is connected to one tab of the jellyroll, and the second end face is recessed to form a welding groove.

* * * * *